United States Patent [19]

Swanson

[11] 4,191,657

[45] Mar. 4, 1980

[54] COMPOSITIONS FOR ACIDIZING SUBTERRANEAN FORMATIONS

[75] Inventor: Billy L. Swanson, Bartlesville, Okla.

[73] Assignee: Phillips Petroleum Company, Bartlesville, Okla.

[21] Appl. No.: 902,122

[22] Filed: May 2, 1978

Related U.S. Application Data

[62] Division of Ser. No. 643,983, Dec. 24, 1975, Pat. No. 4,103,742.

[51] Int. Cl.[2] .............................................. E21B 43/27

[52] U.S. Cl. ............................... 252/8.55 C; 166/282; 252/8.55 R

[58] Field of Search ............... 166/271, 281, 282, 307; 252/8.55 R, 8.55 C

[56] References Cited

U.S. PATENT DOCUMENTS

| | | | |
|---|---|---|---|
| 3,415,319 | 12/1968 | Gibson | 166/308 X |
| 3,451,868 | 6/1969 | Peterson | 149/60 |
| 3,507,720 | 4/1970 | Peterson | 149/60 X |
| 3,679,000 | 7/1972 | Kaufman | 252/8.55 |
| 3,768,565 | 10/1973 | Persinski et al. | 166/308 |
| 3,909,423 | 9/1975 | Hessert et al. | 252/8.55 |
| 3,923,666 | 12/1975 | Dill | 252/8.55 |

*Primary Examiner*—Herbert B. Guynn

[57] ABSTRACT

Gelled acidic compositions suitable for either matrix-acidizing or fracture-acidizing of subterranean formations, and methods of using said compositions in acidizing operations, are provided. Said compositions comprise water, a water-dispersible polymer of acrylamide, an acid, and an aldehyde capable of causing gelation of an aqueous dispersion of said polymer, said acid, and said aldehyde. Preferably a mixture of aldehydes is used. However, either a mixture of aldehydes or a single aldehyde can be used with certain polymers, and in certain methods comprising particular combinations of steps.

9 Claims, No Drawings

COMPOSITIONS FOR ACIDIZING SUBTERRANEAN FORMATIONS

This application is a divisional of Ser. No. 643,983, filed Dec. 24, 1975, now U.S. Pat. No. 4,103,742.

This invention relates to acid treating or acidizing of subterranean formations.

Acid treating or acidizing of porous subterranean formations penetrated by a well bore has been widely employed for increasing the production of fluids, e.g., crude oil, natural gas, etc., from said formations. The usual technique of acidizing a formation comprises introducing a non-oxidizing acid into the well under sufficient pressure to force the acid out into the formation where it reacts with the acid-soluble components of the formation. The technique is not limited to formations of high acid solubility such as limestone, dolomite, etc. The technique is also applicable to other types of formations such as a sandstone containing streaks or striations of acid-soluble components such as the various carbonates.

During the acid treating operation, passageways for fluid flow are created in the formation, or existing passageways therein are enlarged, thus stimulating the production of fluids from the formation. This action of the acid on the formation is often called etching. Acid treating or acidizing operations wherein the acid is injected into the formation at a pressure or rate insufficient to create cracks or fractures in the formation are usually referred to as matrix-acidizing.

Hydraulic fracturing is also commonly employed to increase the production of fluids from subterranean formations. Hydraulic fracturing comprises the injection of a suitable fracturing fluid down a well penetrating a formation and into said formation under sufficient pressure to overcome the pressure exerted by the overburden. This results in creating a crack or fracture in the formation to provide a passageway which facilitates flow of fluids through the formation and into the well. Combination fracture-acidizing processes are well known in the art.

Thus, it is within the scope of the present invention to inject the gelled acidic compositions of the invention into the formation under insufficient pressure to cause fracturing of the formation and carry out a matrix acidizing operation, or inject said gelled acidic composition at sufficient rates and pressure to cause fracturing and carry out a combination fracture-acidizing operation.

One of the problems commonly encountered in acidizing operations is insufficient penetration of the formation by the acid. It is desirable that good penetration be obtained in order to realize maximum benefits from the operation. Too often the acid is essentially completely spent in the area immediately adjacent and surrounding the well bore. The severity of the problem increases as the well temperature increases because acid reactivity with the formation increases with increasing temperatures, as in deeper wells.

Poor penetration can also be caused, and/or aggravated, by fluid loss to the more porous zones of the formation where low permeability is not a problem. Poor penetration can also be caused, and/or aggravated, by leak-off at the fracture faces in combination fracturing-acidizing operations. Either said fluid loss or said leak-off can frequently worsen the situation by leaving the tight (low permeability) zones of the formation unchanged and merely opening up the already high permeability zones.

One solution which has been proposed for the above discussed problem is to incorporate various polymeric thickening or viscosifying agents into the acid solution. Said agents serve to thicken the acid solution and thus increase the viscosity thereof. It has been reported that so thickened acid solutions have reduced fluid loss properties. For example, see U.S. Pat. No. 3,415,319 issued in the name of B. L. Gibson; and U.S. Pat. No. 3,434,971 issued in the name of B. L. Atkins. It has also been reported that the reaction rate of said so-thickened acid solutions with the acid-soluble portions of the formation is lessened or retarded. See, for example, U.S. Pat. No. 3,749,169 issued in the name of J. F. Tate; U.S. Pat. No. 3,236,305 issued in the name of C. F. Parks; and U.S. Pat. No. 3,252,904 issued in the name of N. F. Carpenter.

Higher viscosities are also advantageous in combination fracturing-acidizing operations in that the more viscous acidic solutions produce wider and longer fractures. More viscous acid solutions are also more effective in carrying propping agents into the formation when propping agents are used.

Another problem encountered in acidizing operations, particularly when employing acidizing compositions having thickening or viscosifying agents incorporated therein, is stability to heat. By stability to heat, it is meant the retention of the increased or greater viscosity properties under the conditions of use. Such compositions to be satisfactory should be sufficiently stable to resist degeneration by the heat of the formation for a period of time sufficient to accomplish the intended purpose, e.g., good penetration and significant etching of the formation. The degree of stability required in any particular operation will vary with such operating variables as the type of formation being treated, the temperature of the formation, the well depth (time to pump the acidic composition down the well and into the formation), the acid concentration in the composition, etc. For example, acidizing of a tight low permeability formation will proceed more slowly than a more permeable formation, other factors being the same, because a longer time will be required to obtain a significant amount of etching and the composition must remain in place and effective for a longer period of time. Also, more time will be required to pump the acidic composition into place in the formation.

The temperature of the formation usually has a pronounced effect on the stability of the acidizing compositions and, generally speaking, is one of the most important operating variables when considering stability. Increased formation temperatures usually have at least two undesirable effects. One such effect is degeneration of the composition, e.g., decrease in viscosity. Another such effect is increased rate of reaction of the acid with the formation. Thus, some compositions which would be satisfactory in a low temperature formation such as in the Hugoton field in the Anadarko basin might not be satisfactory in formations encountered in deeper wells as in some West Texas fields.

In ordinary acidizing operations using unthickened acids there is usually no problem in removing the spent acid because it is essentially water. However, a problem which is sometimes encountered when using thickened compositions in treating formations is the ease of removal of the treating composition after the operation is completed. Some thickened or highly viscous solutions are difficult to remove from the pores of the formation or the fracture after the operation is complete. Sometimes a clogging residue can be left in the pores of the formation, or in the fracture. This can inhibit the production of fluids from the formation and can require costly cleanup operations. It would be desirable to have gelled acidic compositions which break down to a lesser viscosity within a short time after the operation is completed.

The present invention provides a solution for, or at least mitigates, the above discussed problems. The present invention provides improved methods for acidizing, or fracture-acidizing, subterranean formations; and new gelled acidic compositions for use in said methods.

Thus, in accordance with one broad aspect of the concept of the invention, there is provided a method for acid treating a porous subterranean formation susceptible of attack by an acid and penetrated by a well bore, which method comprises: injecting into said formation via said well bore a gelled acidic composition comprising water; a water-thickening amount of a water-dispersible polymer selected from the group consisting of polyacrylamides and polymethacrylamides; partially hydrolyzed polyacrylamides and polymethacrylamides wherein a portion of the carboxyamide groups are initially hydrolyzed to carboxyl groups; crosslinked polyacrylamides and crosslinked polymethacrylamides; partially hydrolyzed crosslinked polyacrylamides and partially hydrolyzed crosslinked polymethacrylamides wherein a portion of the carboxamide groups are initially hydrolyzed to carboxyl groups; copolymers of acrylamide or methacrylamide with another ethylenically unsaturated monomer copolymerizable therewith, sufficient acrylamide or methacrylamide being present in the monomer mixture to impart said water-dispersible properties to the resulting copolymer when it is mixed with water; and mixtures thereof;

an amount of an acid which is capable of, and sufficient for, reacting with a significant amount of the acid-soluble components of said formation;

a small but effective amount of a mixture of at least two water-dispersible aldehydes which is sufficient to cause gelation of an aqueous dispersion of said polymer, said acid, and said aldehydes;

said polymer, said acid, and said aldehydes, in the amounts used, being sufficiently compatible with each other in an aqueous dispersion thereof to permit said gelation and thus form a said composition having sufficient stability to degeneration by the heat of said formation to permit good penetration of said composition into said formation; and maintaining said composition in said formation in contact therewith for a period of time usually sufficient for the acid in said composition to react significantly with the acid-soluble components of said formation and stimulate the production of fluids therefrom.

Further, in accordance with another broad aspect of the concept of the invention there is provided a gelled acidic composition, suitable for matrix-acidizing or fracture-acidizing of a subterranean formation, comprising: water; a water-thickening amount of a water-dispersible polymer selected from the group consisting of polyacrylamides and polymethacrylamides wherein up to about 45 percent of the carboxamide groups can be initially hydrolyzed to carboxyl groups; crosslinked polyacrylamides and crosslinked polymethacrylamides wherein up to about 45 percent of the carboxamide groups can be initially hydrolyzed to carboxyl groups; copolymers of acrylamide or methacrylamide with another ethylenically unsaturated monomer copolymerizable therewith, sufficient acrylamide or methacrylamide being present in the monomer mixture to impart said water-dispersible properties to the resulting copolymer when it is mixed with water; and mixtures thereof; an amount of a non-oxidizing acid which is capable of, and sufficient for, reacting with a significant amount of the acid-soluble components of said formation; a small but effective amount of a mixture of at least two water-dispersible aldehydes which is sufficient to cause gelation of an aqueous dispersion of said polymer, said acid, and said aldehydes; said polymer, said acid, and said aldehydes, in the amounts used, being sufficiently compatible with each other in an aqueous dispersion thereof to permit said gelation and thus form a said composition having sufficient stability to degeneration by the heat of said formation to permit good penetration of said composition into said formation and the maintenance of said composition in said formation in contact therewith for a period of time usually sufficient for the acid in said composition to react significantly with the acid-soluble components of said formation and stimulate the production of fluids therefrom.

Still further, in accordance with other broad aspects of the invention, there are provided methods for preparing said gelled acidic compositions.

In some embodiments of the invention only one aldehyde can be used, if desired, instead of a mixture of at least two aldehydes.

As noted above, the gelled acidic compositions of the invention must be suitable for matrix-acidizing or fracture-acidizing of subterranean formations. In order to satisfy this requirement, the polymer, the acid, and the aldehyde(s), in the amounts used, must be sufficiently compatible with each other, in an aqueous dispersion thereof, to permit the gelation of said dispersion and thus form a said composition having sufficient stability to degeneration by the heat of the formation to permit good penetration of said composition into the formation. Furthermore, once said penetration has been attained, the said stability must be sufficient to permit the maintaining of said composition in contact with the formation for a period of time sufficient for the acid in the composition to significantly react with the acid-soluble components of the formation and stimulate the production of fluids therefrom, e.g., by creating new passageways or enlarging existing passageways through said formation.

Herein and in the claims, unless otherwise specified, the term "good penetration" means penetration of live or effective acid into the formation a sufficient distance to result in stimulating the production of fluids therefrom, e.g., by the creation of sufficient new passageways, or sufficient enlargement of existing passageways, through said formation to significantly increase the production of fluids from the formation. This can vary for different formations, well spacings, and what it is desired to accomplish in a given acidizing treatment. Those skilled in the art will usually know what will be "good penetration" for a given formation and a given type of treatment. However, generally speaking, for guidance purposes in the practice of the invention and not by way of limitation of the invention, "good penetration" will usually be considered to be a distance of a few feet, e.g., up to 5 or more, in a small volume matrix acidizing operation, and several hundred feet, e.g., up to 500 or more, in a large volume fracture-acidizing operation.

Herein and in the claims, unless otherwise specified, the term "polymer" is employed generically to include both homopolymers and copolymers; and the term "water-dispersible polymers" is employed generically to include those polymers which are truly water-soluble and those polymers which are dispersible in water or other aqueous medium to form stable colloidal suspensions which can be gelled as described herein. Also, the term "aqueous dispersion" is employed generically to include both true solutions and stable colloidal suspensions of the components of the compositions of the invention which can be gelled as described herein.

Any suitable polymer of acrylamide meeting the above stated compatibility requirements can be used in the practice of the invention. Thus, under proper conditions of use, such polymers can include various polyacrylamides and related polymers which are water-dispersible and which can be used in an aqueous medium, with the gelling agents described herein, to give an aqueous gel. These can include the various substantially linear homopolymers and copolymers of acrylamide and methacrylamide. By substantially linear it is meant that the polymers are substantially free of crosslinking between the polymer chains. Said polymers can have up to about 45, preferably up to about 40, percent of the carboxamide groups hydrolyzed to carboxyl groups. Generally speaking, as the degree of hydrolysis increases, the polymers tend to become more difficult to disperse in aqueous acidic media. Thus, one presently more preferred group of polymers includes those wherein not more than about 20 percent of the carboxamide groups are hydrolyzed. As used herein and in the claims, unless otherwise specified, the term "hydrolyzed" includes modified polymers wherein the carboxyl groups are in the acid form and also such polymers wherein the carboxyl groups are in the salt form, provided said salts are water-dispersible. Such salts include the ammonium salts, the alkali metal salts, and others which are water-dispersible. Hydrolysis can be carried out in any suitable fashion, for example, by heating an aqueous solution of the polymer with a suitable amount of sodium hydroxide.

As used herein and in the claims, unless otherwise specified, the stated values for "degree of hydrolysis" or "percent hydrolyzed", and like terms, refer to initial values prior to use or test of the polymer. Unless otherwise stated, said values were obtained by the following analytical procedure. Place 200 ml of distilled water in a beaker provided with a magnetic stirrer. Weigh a 0.1 gram polymer sample accurately to ±0.1 mg. Start the stirrer and quantitatively transfer the weighed sample into the water vortex. Stir at a rapid rate overnight. Using a pH meter and 1:1 diluted HCl, adjust the pH of the sample solution to less than 3.0. Stir the solution for 30 minutes. Adjust the pH of the solution to exactly 3.3 by dropwise addition of 0.1 N NaOH. Then slowly titrate with standard 0.1 N NaOH from pH 3.3 to pH 7.0.

$$\% \text{ Hydrolysis} = (V \times N \times 0.072 \times 100)/W$$

where:

$V$ = ml of base used in titration;

$N$ = normality of base;

$W$ = grams of polymer sample; and 0.072 = milliequivalent weight of acrylic acid.

Substantially linear polyacrylamides can be prepared by methods known in the art. For example, the polymerization can be carried out in aqueous medium, in the presence of a small but effective amount of a water-soluble oxygen-containing catalyst, e.g., a thiosulfate or bisulfate of potassium or sodium or an organic hydroperoxide, at a temperature between about 30° and 80° C. The resulting polymer is recovered from the aqueous medium, as by drum drying, and can be subsequently ground to the desired particle size. The particle size should be fine enough to facilitate dispersion of the polymer in water. A presently preferred particle size is such that about 90 weight percent will pass through a number 10 mesh sieve, and not more than about 10 weight percent will be retained on a 200 mesh sieve (U.S. Bureau of Standard Sieve Series).

Under proper conditions of use, examples of copolymers which can be used in the practice of the invention can include the water-dispersible copolymers resulting from the polymerization of acrylamide or methacrylamide with an ethylenically unsaturated monomer copolymerizable therewith. It is desirable that sufficient acrylamide or methacrylamide be present in the monomers mixture to impart to the resulting copolymer the above-described water-dispersible properties. Any suitable ratio of monomers meeting this condition can be used. Under proper conditions of use, examples of suitable ethylenically unsaturated monomers can include acrylic acid, methacrylic acid, vinylsulfonic acid, vinylbenzylsulfonic acid, vinylbenzenesulfonic acid, vinyl acetate, acrylonitrile, methyl acrylonitrile, vinyl alkyl ether, vinyl chloride, maleic anhydride, vinyl substituted cationic quaternary ammonium compounds, and the like. Various methods are known in the art for preparing said copolymers. For example, see U.S. Pat. Nos. 2,625,529; 2,740,522; 2,727,557; 2,831,841; and 2,909,508. Said copolymers can be used in the hydrolyzed form, as discussed above for the homopolymers.

One presently preferred group of copolymers for use in the practice of the invention are the copolymers of acrylamide or methacrylamide with a monomer of the formula

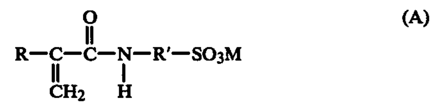

(A)

wherein: R is hydrogen or a lower alkyl radical containing from 1 to 6 carbon atoms, said R preferably being hydrogen or a methyl radical; R′ is an alkylene radical containing from 1 to 24 carbon atoms or an arylene radical containing from 6 to 10 carbon atoms, said R′ preferably being an alkylene radical containing from 2 to about 10 carbon atoms; and M is hydrogen, ammonium, or an alkali metal, said M preferably being hydrogen, sodium, or potassium; and wherein the number of repeating units from said formula (A) monomer is within the range of from 1 to 90, preferably 5 to 80, more preferably 10 to 70, mol percent.

Monomers of the above formula (A) and methods for their preparation are known in the art. For example, see U.S. Pat. No. 3,507,707, issued Apr. 14, 1970 in the name of L. E. Miller et al; and U.S. Pat. No. 3,768,565, issued Oct. 30, 1973 in the name of L. J. Persinski et al. In the above formula (A), when R is hydrogen, R′ is

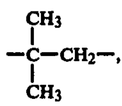

and M is hydrogen, said monomer is the well known AMPS (trademark) monomer, 2-acrylamido-2-methylpropanesulfonic acid, which is available commercially from The Lubrizol Corporation, Cleveland, Ohio. The alkali metal salts of said monomer, e.g., sodium 2-acrylamido-2-methylpropane sulfonate, are also readily available.

Copolymers of acrylamide with said AMPS monomer, and/or its sodium salt, are known. For example, see the above-mentioned Persinski patent. A number of said copolymers are also available from Hercules Incorporated, Wilmington, Delaware. For example, Hercules SPX-5024, a 90:10 acrylamide/AMPS sodium salt copolymer; Hercules SPX-5022, an 80:20 acrylamide/AMPS sodium salt copolymer; Hercules SPX-5023, a 50:50 acrylamide/AMPS sodium salt copolymer; and Hercules SPX-5025, a 30:70 acrylamide/AMPS sodium salt copolymer. The above type of copolymers wherein the number of units from said formula (A) monomer is within the range of from 10 to 70 mol percent, thus comprise one presently more preferred group of copolymers for use in the practice of the invention. Said copolymers can be represented by the formula

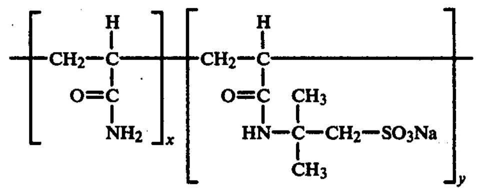

(B)

wherein x and y represent the mol percent of said units as set forth above, it being understood that the various copolymers do not necessarily consist of alternating units as depicted above in (B). It is also within the scope of the invention for the acrylamide units in the above formula (B) to be methacrylamide units, and for a portion of the $—NH_2$ groups in said units to be hydrolyzed.

Thus, it is also within the scope of the invention for the acrylamide units in the above formula (B) to be derived from either acrylamide or methacrylamide wherein the $—NH_2$ group can be $NH_2$ or —OM as defined below. Thus, copolymers of said derivatives with the above monomer (A) can be represented by the formula

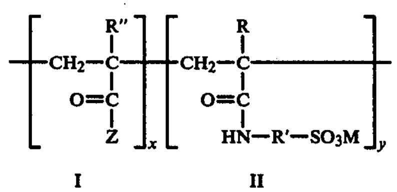

(B')

wherein: R, R', and M are as defined above in formula (A); R'' is hydrogen or a methyl radical; Z is either $—NH_2$ or —OM in the above Type I monomer units, with the proviso that the copolymer contains at least 10 mol percent of said Type I monomer units in which Z is $—NH_2$; and x and y are the mol percent values of the respective individual monomer units I and II, with x being in the range of from 10 to 99, preferably 20 to 95, more preferably 30 to 90, and with y being in the range of from 1 to 90, preferably 5 to 80, more preferably 10 to 70; and with it being understood that the various copolymers do not necessarily consist of alternating monomer units as depicted in formula (B'), e.g., the copolymers are random copolymers as represented by the broken lines connecting said monomer units. It is presently believed that in the above copolymers it is desirable that there be at least 10 mol percent of monomer units containing the $—CONH_2$ group in order for gelation to take place in the presence of an aldehyde gelling agent in accordance with the invention.

Another presently preferred group of copolymers for use in the practice of the invention are the copolymers of acrylamide or methacrylamide with a monomer of the formula

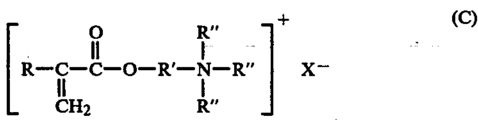

(C)

wherein: R is hydrogen or a lower alkyl radical containing from 1 to 6 carbon atoms, said R preferably being hydrogen or a methyl radical; R' is an alkylene radical containing from 1 to 24 carbon atoms or an arylene radical containing from 6 to 10 carbon atoms, said R' preferably being an alkylene radical containing from 2 to about 10 carbon atoms; each R'' is an alkyl radical containing from 1 to 6 carbon atoms, preferably from 1 to 4 carbon atoms; X is any suitable anion such as methylsulfate, ethylsulfate, chloride, bromide, acetate, nitrate, and the like; and wherein the number of repeating units from said formula (C) monomer is within the range of from 1 to 90, preferably 5 to 70, more preferably 10 to 60, mol percent.

Monomers of the above formula (C) and methods for their preparation are known in the art. For example, see U.S. Pat. No. 3,573,263, issued Mar. 30, 1971 in the name of E. A. Gill. In the above formula (C), when R is H, R' is $—CH_2—CH_2—$, one R'' is a methyl radical and the other two R'' are each an ethyl radical, and X is a $CH_3SO_4^-$ anion, the monomer is the commercially available material (acryloyloxyethyl)diethylmethylammonium methyl sulfate, which can be referred to as DEMMS. In the above formula (C), when R is a methyl radical, R' is $—CH_2—CH_2—$, each R'' is a methyl radical, and X is a $CH_3SO_4^-$ anion, the monomer is the commercially available material (methacryloyloxyethyl)trimethylammonium methylsulfate, sometimes referred to as MTMMS.

Copolymers of acrylamide with said DEMMS monomer are commercially available, for example, an 80:20 acrylamide/DEMMS copolymer. Copolymers of acrylamide with said MTMMS monomer are also commercially available, for example, Hercules Reten 210, a 90:10 acrylamide/MTMMS copolymer; Hercules Reten 220, an 80:20 acrylamide/MTMMS copolymer; Hercules Reten 245, a 55:45 acrylamide/MTMMS copolymer; and Hercules Reten 260, a 40:60 acrylamide/MTMMS copolymer. The type of copolymers wherein the number of units from said formula (C) monomer is within the range of from 10 to 60 mol percent thus comprise another more preferred group of copolymers for use in the practice of the invention. Said copolymers can be represented by the formula

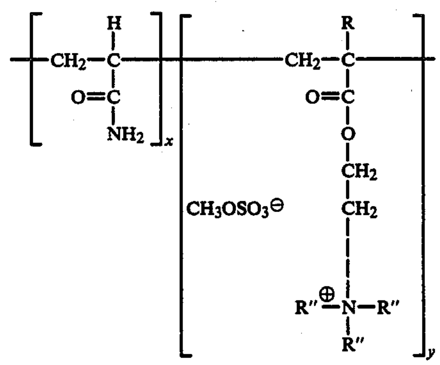

wherein: R is either hydrogen or a methyl radical; each R″ is a methyl radical, or one R″ is a methyl radical and the other two R″ are each an ethyl radical; and x and y represent the mol percent of said units as set forth above, it being understood that the various copolymers do not necessarily consist of alternating units as depicted above in (D). It is also within the scope of the invention for the acrylamide units in the above formula (D) to be methacrylamide units, and for a portion of the —$NH_2$ groups in said units to be hydrolyzed.

Thus, it is also within the scope of the invention for the acrylamide units in the above formula (D) to be derivatives of either acrylamide or methacrylamide wherein the —$NH_2$ groups can be —$NH_2$ or —OM as defined below. Thus, copolymers of said derivatives with the above monomer (C) can be represented by the formula

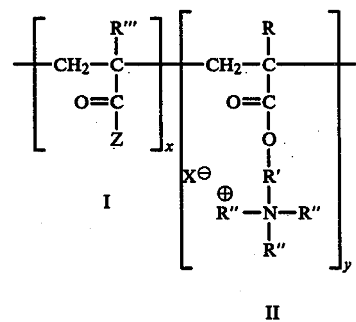

wherein: R, R′, R″, and X are as defined above in formula (C); R‴ is hydrogen or a methyl radical; in the above Type I monomer units, Z is either —$NH_2$ or —OM wherein M is hydrogen, ammonium, or an alkali metal, with said M preferably being hydrogen, sodium, or potassium, and with the proviso that the copolymer contains at least 10 mol percent of said Type I monomer units in which Z is —$NH_2$; x and y are the mol percent values of the respective individual monomer units I and II, with x being in the range of from 10 to 99, preferably 30 to 95, more preferably 40 to 90, and with y being in the range of from 1 to 90, preferably 5 to 70, more preferably 10 to 60; and with it being understood that the various copolymers do not necessarily consist of alternating monomer units as depicted in formula (D′), e.g., the copolymers are random copolymers as represented by the broken lines connecting said monomer units. It is presently believed that in the above copolymers it is desirable that there be at least 10 mol percent of monomer units containing the —$CONH_2$ group in order for gelation to take place in the presence of an aldehyde gelling agent in accordance with the invention.

Crosslinked polyacrylamides and crosslinked polymethacrylamides, including those at various stages of hydrolysis as described above, and meeting the above-stated compatibility requirements, can also be used in the practice of the invention. In general, said crosslinked polyacrylamides can be prepared by the methods described above, but including in the monomeric mixture a suitable amount of a suitable crosslinking agent. Examples of crosslinking agents can include methylenebisacrylamide, divinylbenzene, divinyl ether, and the like. Said crosslinking agents can be used in small amounts, e.g., up to about 1 percent by weight of the monomeric mixture. Such crosslinking is to be distinguished from any crosslinking which occurs when solutions of polymers and the other components of the gelled acidic compositions of the invention are gelled as described herein.

All the polymers useful in the practice of the invention are characterized by high molecular weight. The molecular weight is not critical so long as the polymer has the above-described water-dispersible properties and meets the above-stated compatibility requirements. It is preferred that the polymer have a molecular weight of at least 500,000, more preferably at least about 2,000,000. The upper limit of molecular weight is unimportant so long as the polymer is water-dispersible, and the gelled acidic composition therefrom can be pumped. Thus, it is within the scope of the invention to use polymers having molecular weights as high as 20,000,000 or higher, and meeting said conditions.

The amount of the above-described polymers used in preparing the gelled acidic compositions of the invention can vary widely depending upon the particular polymer used, the purity of said polymer, and properties desired in said compositions. In general, the amount of polymer used will be a water-thickening amount, i.e., at least an amount which will significantly thicken the water to which it is added. For example, amounts in the order of 25 to 100 parts per million by weight (0.0025 to 0.01 weight percent) have been found to significantly thicken water. Distilled water containing 25 ppm of a polymer of acrylamide having a molecular weight of about $10\times10^6$ had a viscosity increase of about 41 percent. At 50 ppm the viscosity increase was about 106 percent. At 100 ppm the viscosity increase was about 347 percent. As another example, distilled water containing 25 ppm of a polymer of acrylamide having a molecular weight of about $3.5\times10^6$ had a viscosity increase of about 23 percent. At 50 ppm the viscosity increase was about 82 percent. At 100 ppm the viscosity increase was about 241 percent. Generally speaking, amounts of the above-described polymers in the range of from 0.2 to 3, preferably from 0.3 to about 2, weight percent, based on the total weight of the composition, can be used in preparing gelled acidic compositions for use in the practice of the invention.

As a further guide, when the polymer used is one of the above-discussed AMPS or AMPS salt copolymers containing 50 mol percent or more AMPS or AMPS salt units, the polymer concentration will preferably be in the range of from 0.6 to 3, more preferably 0.75 to about 2 weight percent, based on the total weight of the composition. Similarly, when the polymer used is a partially hydrolyzed polyacrylamide or polymethacrylamide, or one of the above-discussed MTMMS or DEMMS copolymers, the polymer concentration will preferably be in the range of from 0.75 to about 2 weight percent, based on the total weight of the composition. However, it is within the scope of the invention to use amounts outside said ranges. In general; with the proper amounts of acid and aldehyde, the amount of polymer used will determine the consistency of the gel obtained. Small amounts of polymer will usually produce liquid mobile gels which can be readily pumped. Large amounts of polymer will usually produce thicker, more viscous, somewhat elastic gels. Gels having a viscosity "too thick to measure" by conventional methods can still be used in the practice of the invention. Thus, there is really no fixed upper limit on the amount of polymer which can be used so long as the gelled acidic composition can be pumped in accordance with the methods of the invention.

Any suitable water-dispersible aldehyde meeting the above-stated compatibility requirements can be used in the practice of the invention. Thus, under proper conditions of use, both aliphatic and aromatic monoaldehydes, and also dialdehydes, can be used. The aliphatic monoaldehydes containing from 1 to about 10 carbon atoms per molecule are presently preferred. Representative examples of such aldehydes include formaldehyde, paraformaldehyde, acetaldehyde, propionaldehyde, butyraldehyde, isobutyraldehyde, valeraldehyde, heptaldehyde, decanal, and the like. Representative examples of dialdehydes include glyoxal, glutaraldehyde, terephthaldehyde, and the like. Various mixtures of said aldehydes can also be used in the practice of the invention. The term "water-dispersible" is employed generically herein to include both those aldehydes which are truly water-soluble and those aldehydes of limited water solubility but which are dispersible in water or other aqueous media to be effective gelling agents.

Any suitable amount of said aldehydes can be used in the practice of the invention. In all instances the amount of aldehyde used will be a small but effective amount which is sufficient to cause gelation of an aqueous dispersion of the polymer, the acid, and the aldehyde. As a general guide, the amount of aldehyde used in preparing the gelled acidic compositions of the invention will be in the range of from 0.001 to about 5, preferably 0.004 to about 2, weight percent, based on the total weight of the composition. Too much aldehyde can be detrimental to gel stability, e.g., cause or promote syneresis and/or cause the gel to become brittle. Those skilled in the art can determine the amount of aldehyde to be used by suitable experiments carried out in the light of this disclosure.

Acids useful in the practice of the invention include any acid meeting the above-stated compatibility requirements and which is effective in increasing the flow of fluids, e.g., hydrocarbons, through the formation and into the well. Thus, under proper conditions of use, examples of such acids can include inorganic acids such as hydrochloric acid, phosphoric acid, nitric acid, and sulfuric acid; $C_1$–$C_4$ organic acids such as formic acid, acetic acid, propionic acid, butyric acid, and mixtures thereof, and combinations of inorganic and organic acids. The non-oxidizing acids are preferred. The concentration or strength of the acid can vary depending upon the type of acid, the type of formation being treated, the above-stated compatibility requirements, and the results desired in the particular treating operation. Generally speaking, the concentration can vary from 0.4 to about 60 weight percent, depending upon the type of acid, with concentrations within the range of 10 to 50 weight percent usually preferred, based upon the total weight of the gelled acidic composition. When an inorganic acid such as hydrochloric acid is used it is presently preferred to use an amount which is sufficient to provide an amount of HCl within the range of from 0.4 to about 35, more preferably at least about 10, weight percent based on the total weight of the gelled acidic composition. Amounts within the range of about 10 to about 30 weight percent will frequently be practical amounts to use. The acids used in the practice of the invention can contain any of the known corrosion inhibitors, deemulsifying agents, sequestering agents, surfactants, friction reducers, etc., known in the art, and which meet the above-stated compatibility requirements.

The gelled acidic compositions of the invention are aqueous compositions. They normally contain a significant amount of water. The amount of said water can vary widely depending upon the concentrations of the other components in the compositions, particularly the concentration of the acid. For example, when an organic acid such as acetic acid is used in a concentration of 60 weight percent, the amount of water present in the composition clearly will be less than when an inorganic acid such as HCl is used in the maximum concentration of about 35 weight percent. Thus, while no precise overall range of water content can be set forth, based on the above-stated overall ranges for the concentrations of said other components, the water content of said compositions can be in the range of from about 30 to about 99, frequently about 60 to about 90, weight percent. However, amounts of water outside said ranges can be used.

Propping agents can be included in the gelled acidic compositions of the invention if desired. Propping agents which can be used include any of those known in the art, e.g., sand grains, walnut shell fragments, tempered glass beads, aluminum pellets, and similar materials, so long as they meet the above-stated compatibility requirements. Generally speaking, it is desirable to use propping agents having particle sizes in the range of 8 to 40 mesh (U.S. Sieve Series). However, particle sizes outside this range can be employed. When propping agents are used they should be made of materials which are not severely attacked by the acid used during the time they are exposed to said acid.

Any suitable method can be employed for preparing the gelled acidic compositions of the invention. Thus, any suitable mixing technique or order of addition of the components of said composition to each other can be employed which will provide a said composition having sufficient stability to degeneration by the heat of the formation (in which the composition is to be used) to permit good penetration of the composition into, and significant etching of, said formation. However, it is ordinarily preferred to first dissolve or disperse the polymer in water before contacting the polymer with acid. The mixing order can vary with the type of polymer used. Some suitable mixing orders, with the components named in order of mixing, include: water—polymer—acid—aldehyde; water—acid—polymer—aldehyde; acid—polymer—water—aldehyde; and water—polymer—aldehyde—acid; and the like. It is within the scope of the invention to moisten or slurry the polymer with a small amount, e.g., about 1 to about 6 weight percent based on the weight of the polymer of a small amount of a low molecular weight alcohol, e.g., $C_1$ to $C_3$ alcohols, as a dispersion aid prior to dispersing the polymer in water. It is preferred that there be no undue delay between completing the preparation of the gelled acidic composition and its introduction into contact with the formation.

The gelled acidic compositions of the invention can be prepared on the surface in a suitable tank equipped with suitable mixing means, and then pumped down the well and into the formation employing conventional equipment for pumping acidic compositions. However, it is within the scope of the invention to prepare said compositions while they are being pumped down the well. This technique is sometimes referred to as "on the fly". For example, a solution of the polymer in water can be prepared in a tank adjacent the well head. Pumping of this solution through a conduit to the well head can then be started. Then, a few feet downstream from the tank a suitable connection can be provided for introducing either the acid or the aldehyde into said conduit, preferably as an aqueous solution. Then, a few feet farther downstream the other of said acid or aldehyde components can be similarly introduced. As will be understood by those skilled in the art, the rate of introduction of said components into said conduit will depend upon the pumping rate of the polymer solution through said conduit. Any of the above-mentioned orders of addition can be employed in said "on the fly" technique. Mixing orifices can be provided in said conduit, if desired.

It is within the scope of the invention to precede the injection of the gelled acidic composition into the well and out into the formation with a preflush of a suitable cooling fluid, e.g., water. Such fluids serve to cool the well tubing and formation and extend the useful operating temperature range of said compositions. The volume of said cooling fluid so injected can be any suitable volume sufficient to significantly decrease the temperature of the formation being treated, and can vary depending upon the characteristics of the formation. For example, amounts up to 20,000 gallons, or more, can be used to obtain a temperature decrease in the order of 100° to 250° F.

The following examples will serve to further illustrate the invention, but should not be considered as unduly limiting on the invention. In carrying out the examples the following general procedure was employed.

A 3.0 weight percent stock solution of polymer or copolymer was prepared at ambient temperature in deionized water. A portion of this stock solution weighed into a beaker was admixed with sufficient water and concentrated hydrochloric acid (37 weight percent HCl), e.g., to give the desired polymer concentration and acid concentration in individual samples for the test runs. Sufficient aldehyde and water was added to the acid and polymer-containing solution to give about 100 ml of solution. After addition of the aldehyde, the solutions were stirred for about 20 seconds before transferring a 15 ml portion thereof into a Kimax No. 500 capillary viscometer for viscosity measurements which are reported herein as the efflux time in seconds corresponding to the time required for the fluid level to drop from one mark to another on the capillary arm of the viscometer. After the first measurement of efflux time, the viscometer containing the sample was placed in a water bath at about 87° F. The temperature of the water bath was increased at a rate sufficient for the bath temperature to reach about 200° F. in about one hour. During this heating period the efflux time of the sample was repeatedly measured at different temperatures over the entire temperature range. The temperature at which little or no movement of the fluid in the capillary could be detected was designated as the gelation temperature. The onset of gelation was signaled by an increase in the efflux time over a temperature interval and this interval is indicated in the examples.

The behavior of the gelled acidic compositions at higher temperatures was observed in glass pressure vessels immersed in a heated oil bath at about 250° F.

EXAMPLE I

Three concentrations of formaldehyde were used to gel 1 weight percent aqueous solutions of a partially hydrolyzed polyacrylamide containing 28 weight percent hydrochloric acid. The polyacrylamide used was a commercially available acrylamide homopolymer (Hercules Reten 420) having a degree of hydrolysis of 6.3 percent. The results of these runs are summarized below.

Table I

| Run No. | Gelation Temperature, °F. | Concentration of HCHO (weight percent) | Observations |
|---|---|---|---|
| 1 | No Gelation | 0.0 | No gelation |
| 2 | 148[a] | 0.004 | At 190° F. the gel is elastic and clear. At 199° F. the gel became cloudy. |
| 3 | 108–115[b] | 0.16 | Cloudy at 156° F., brittle with a little syneresis at 168° F. Syneresis at 192° F. is about 50%. |
| 4 | 98[c] | 2.0 | Rigid gel with a trace of syneresis at 180° F. At 200° F. there is at least 50% syneresis. |

[a]Gelation began in the temperature interval of 116°–144° F. as evidenced by an increase in efflux time from 17 to 23 seconds.
[b]Gelation began in the temperature interval of 100°–107° F. as evidenced by an increase in efflux time from 15.5 to 18 seconds.
[c]Gelation began in the temperature interval of 77°–94° F. as evidenced by an increase in efflux time from 19.5 to 35 seconds.

As shown by the results in Table I, the gelation temperature was decreased from about 148° F. to 98° F. as the formaldehyde concentration was increased from 0.004 weight percent to 2 weight percent formaldehyde.

EXAMPLE II

A gel was prepared from a 28 weight percent aqueous hydrochloric acid solution containing 0.24 weight percent acetaldehyde and 1 weight percent polyacrylamide (Hercules Reten 420). This solution gelled at 87° F. in less than one minute, and at 197° F. the gel was still clear and elastic. After 20 minutes at 200° F., syneresis was about 10 percent but the gel was still elastic. An unheated portion of the gel became brittle and exhibited some syneresis after 4.5 hours.

EXAMPLE III

Gelation occurred at 115° F. upon heating a 28 weight percent solution of hydrochloric acid containing 0.4 weight percent isobutyraldehyde and 1 weight percent of polyacrylamide (Reten 420). Gelation began in the temperature interval 102°-109° F. as evidenced by an increase in efflux time from about 18.6 to 29 seconds. This gel thinned at about 175° F. and broke between 181° F. and 187° F. giving a homogeneous amber fluid at about 198°-200° F.

A similar run using 0.4 weight percent n-butyraldehyde gelled at ambient temperature in about one minute. The gel was clear at 160° F. and began to thin at 194° F. After about 30-35 minutes at 200° F., syneresis was about 30%.

EXAMPLE IV

A 100 g sample of 28 weight percent aqueous HCl containing 1 weight percent of polyacrylamide (Reten 420) and 0.5 g valeraldehyde gelled in about one minute at 86° F. The gel remained clear and elastic on heating to about 175° F. The gel became cloudy at about 185° F. and at 200° F. syneresis was about 20%, but the remaining gel was elastic.

EXAMPLE V

In a solution containing 28 weight percent HCl, 1 weight percent polyacrylamide (Reten 420) and 0.6 weight percent heptaldehyde, a gel formed within 2 minutes at 91° F. This gel remained elastic up to about 200° F. at which temperature there was approximately 10% syneresis.

EXAMPLE VI

A mixture of 28 weight percent aqueous HCl containing 0.5 weight percent paraformaldehyde and 1 weight percent of a 30:70 acrylamide/sodium-2-acrylamido-2-methylpropanesulfonate copolymer (Hercules SPX-5025) was heated to 130° F. to dissolve the paraformaldehyde. A 15 ml portion of the resulting solution was transferred to a capillary viscometer and on heating to 156° F. gelation occurred. Gelation began in the temperature interval of 153°-154° F. as evidenced by an increase in efflux time from 2.7 to 6.5 seconds. On further heating of this gel to 200° F. the gel remained clear and no syneresis was evident.

EXAMPLE VII

A solution of 28 weight percent HCl containing 0.35 weight percent glyoxal and 1 weight percent polyacrylamide (Reten 420) gelled at 126° F. Gelation began in the temperature interval of 116°-121° F. as evidenced by an increase in efflux time from 17.6 to 32.1 seconds. On heating to 186° F. a trace of syneresis was evident, but the gel was still elastic. At 200° F. syneresis was about 15% and the gel was still elastic.

EXAMPLE VIII

Glutaraldehyde (0.25 weight percent of total reaction mixture) caused gelation of a solution of 28 weight percent aqueous hydrochloric acid containing 1 weight percent polyacrylamide (Reten 420) in one minute at 89° F. On heating to 182° F. the gel became brittle and syneresis was about 10%.

EXAMPLE IX

A mixture of 28 weight percent HCl containing 0.5 weight percent terephthaldehyde and 1 weight percent polyacrylamide (Reten 420) gelled at 136°-137° F. Gelation began in the temperature interval of 124°-130° F. as evidenced by an increase in efflux time from 25 to 50 seconds. On heating to the temperature range 160°-170° F., the gel thinned remarkably as evidenced by decreasing efflux time.

EXAMPLE X

Several runs were carried out to demonstrate the influence of acid concentration on the gelation of an aqueous solution of 2 weight percent formaldehyde and 1 weight percent polyacrylamide (Reten 420). The results of these runs which were carried out in a capillary viscometer employing the general procedure described above are summarized in Table II.

Table II

Influence of HCl Concentration on Gelation of Polyacylamide (Reten 420) in Aqueous Hydrochloric Acid

| Acid Concentration | Gelation Temperature | Comments |
|---|---|---|
| pH 5.5 | No Gelation | Approximate acid concentration $[H_3O^+]$ was $3 \times 10^{-6}$ molar |
| pH 1.9<br>0.4 weight percent HCl | 185° F.[a] | The mixture did not gel at room temperature in 2 hours. The mixture gelled in 50 minutes as the bath temperature was increased from 74° F. to 185° F. |
| 15 weight percent HCl | 109° F.[b] | The mixture gelled in 8-10 minutes as the bath temperature was increased from 85° F. to about 105-110° F. |
| 28 weight percent HCl | 98° F.[c] | The mixture gelled in 4 minutes as the bath temperature was increased from 77° F. to 98° F. |

[a]Gelation began in the temperature interval of 177°-183° F. as evidenced by an increase in efflux time from 10.3 to 32.9 seconds.
[b]Gelation began in the temperature interval of 100°-103° F. as evidenced by an increase in efflux time from 30 to 43 seconds.
[c]Gelation began in the temperature interval of 77°-94° F. as evidenced by an increase in efflux time from 19.5 to 35 seconds.

EXAMPLE XI

In order to study the retardation of acid reactivity with formations, e.g., limestone formations, the weight changes of limestone samples contacted with ungelled acid systems, and gelled acid systems in accordance with the invention, were investigated. The limestone samples were approximately ⅝" cubes cut from three pieces of core secured from the Smackover limestone in Hopkins County, Texas. The acid systems studied contained: (a) aqueous 28% HCl alone (Runs 1 and 2); (b) aqueous 28% HCl, and a 30:70 copolymer of acrylamide and sodium 2-acrylamido-2-methylpropanesulfonate (Hercules SPX-5025) (Run 3); gelled system containing aqueous hydrochloric acid, formaldehyde, and a 30:70 copolymer of acrylamide and sodium 2-acrylamido-2-methylpropane-1-sulfonate (Runs 4 and 5). The results of these runs are summarized in Table III.

Table II

| Run No. | Test Temperature, °F. | Time of Heating (Min.) | Components of Acid System | State of Acid System | Wt. Loss of Limestone Sample (grams/min) |
|---|---|---|---|---|---|
| | | Retardation of Acid Reactivity With Limestone | | | |
| 1 | 150 | 2 | 28% HCl | Ungelled | 4.5 |
| 2 | 190–200 | 2 | 28% HCl | Ungelled | 4.6 |
| 3 | 200 | 10 | 28% HCl<br>1% Copolymer | Ungelled | 0.43 |
| 4 | 150 | 10 | 28% HCl<br>1% Copolymer<br>0.16% Formaldehyde | Gelled | 0.12 |
| 5 | 200 | 10 | 28% HCl<br>1% Copolymer<br>0.16% Formaldehyde | Gelled | 0.2 |

Based on the results in Table III (note especially the Weight Loss column) it is concluded that the invention gelled compositions of Runs 4 and 5 retard the rate of reaction between hydrochloric acid and the limestone sample as compared to 28% HCl of control Runs 1 and 2. Control Run 3 demonstrates that the ungelled combination of acid and polymer is less aggressive toward limestone than the acid alone (Runs 1 and 2). However, the ungelled acid/polymer mixture of Run 3 is more reactive at 200° F. than the invention gelled composition of Run 5. From these results it is concluded that the inventive gelled acid systems could penetrate more deeply into a subterranean limestone-containing formation before all the acid was spent.

EXAMPLE XII

Over the temperature range of 86°–196° F., a 1 weight percent solution of a homopolymer of sodium 2-acrylamido-2-methylpropane-1-sulfonate (Hercules SPX-5185) did not produce a gel on mixing with 28 weight percent aqueous hydrochloric acid containing 0.4 weight percent formaldehyde.

EXAMPLE XIII

A solution of 28 weight percent aqueous HCl containing 1 weight percent 50:50 acrylamide/sodium 2-acrylamido-2-methylpropanesulfonate copolymer (Hercules SPX-5023) was gelled with 2 weight percent formaldehyde at about 114° F. Gelation began in the temperature interval of 100°–107° F. as evidenced by an increase in efflux time from 12.3 to 99 seconds. On gradually heating the gel in a hot water bath to about 200° F., the gel never thinned but assumed a brittle consistency. In a similar run using 15 weight percent aqueous hydrochloric acid, the solution gelled at 151° F. In another run using 0.5 weight percent of the copolymer in 28 weight percent aqueous hydrochloric acid, the solution gelled at 159° F.

EXAMPLE XIV

A mixture of 28 weight percent aqueous HCl containing 1 weight percent 30:70 acrylamide/sodium 2-acrylamido-2-methylpropanesulfonate copolymer (Hercules SPX-5025) was gelled with 2 weight percent formaldehyde at about 156° F. Gelation began in the temperature interval of 144°–154° F. as evidenced by an increase in efflux time from 3.2 to 16 seconds. A duplicate sample was gelled within 2–3 minutes by immersing the viscometer in a 185° F. water bath. The gel was heated at 200° F. for one hour with little or no visible change.

In a similar run using the same copolymer at a copolymer concentration of 2.0 weight percent, gelation occurred at 123° F. Gelation began in the temperature interval of 100°–110° F. as evidenced by an increase in efflux time from 26 to 120 seconds. No gel was produced in a similar run using a copolymer concentration of 0.5 weight percent.

EXAMPLE XV

The gelation of a solution of an acrylamide copolymer (Hercules SPX-5025) using both formaldehyde and acetaldehyde is described in this example. Gelation of a solution containing 1 weight percent 30:70 acrylamide/-sodium 2-acrylamido-2-methylpropanesulfonate copolymer and 28 weight percent hydrochloric acid was effected with 0.13 weight percent formaldehyde and 0.25 weight percent acetaldehyde at 151° F. as the bath temperature was increased from 87° F. to 151° F. over a period of 25 minutes.

Another portion of this gel was transferred to a glass pressure vessel, heated to about 180° F. in 15 minutes, and then sealed. This sealed vessel was placed in a 250° F. oil bath and the following observations were made.

| Minutes in 260° F. Bath | Observations |
|---|---|
| 5 | Gel flows 1/3 into neck of vessel when vessel is tilted; some bubbles are visible |
| 10 | No change from above |
| 15 | Slightly darker in color, otherwise no change |
| 20 | No change other than darker color |
| 30 | Very little change, but will flow into neck if gently shaken |
| 40 | An elastic gel; can be shaken about 1/3 into neck of vessel |
| 60 | Gel is stiffer but still elastic |
| 120 | A stiff elastic gel |

The total mixed aldehyde weight used in Example XV amounted to 0.38 weight percent of the total reaction mixture. The high temperature stability of the gel prepared in the above Example XV with 30:70 acrylamide/sodium 2-acrylamido-2-methylpropanesulfonate copolymer (Hercules SPX-5025) was superior to that exhibited by the gels of the following Examples XVI and XVII formed from solutions containing 0.38 weight percent acetaldehyde alone, and 0.4 weight percent formaldehyde alone, respectively.

EXAMPLE XVI

Gelation of a 28 weight percent aqueous HCl solution containing 1 weight percent of a 30:70 acrylamide/-sodium 2-acrylamido-2-methylpropanesulfonate copolymer (Hercules SPX-5025) was effected within several minutes with 0.38 weight percent acetaldehyde at ambient temperature.

A 15 ml portion of the test solution was drawn into a capillary viscometer and the viscometer placed in a water bath initially at 118° F., and then the bath temperature was increased to about 194° F. over a period of about 60 minutes. No gelation was observed in the capillary viscometer. From this result it is concluded that the gel which formed at ambient temperature in the unheated test solution has less thermal stability than the gel of Example XV in which a mixture of acetaldehyde and formaldehyde was used.

EXAMPLE XVII

Gelation of a 28 weight percent aqueous HCl solution containing 1 weight percent 30:70 acrylamide/sodium 2-acrylamido-2-methylpropanesulfonate copolymer (Hercules SPX-5025) was effected with 0.4 weight percent formaldehyde.

A 150 ml test sample of the above composition was heated to 200° F. in an uncapped pressure vessel before sealing the bottle and placing it in an oil bath at 250° F. The sample gelled during said heating to 200° F. The following observations were noted:

| Minutes in 250° F. Bath | Observations |
|---|---|
| 20 | Large bubbles appeared in the gel |
| 50 | The gel is stiff and elastic and will not flow easily into the neck of the bottle when the bottle is tilted. |
| 60 | Gel is thinner and flows readily into the neck of the bottle. Gel is elastic, homogeneous, and very viscous fluid |
| 70 | Gel is still homogeneous clear fluid but much less viscous |
| 80 | The gel still has some viscosity and is still homogeneous |

Based on the results of Example XVII it is concluded that the gel formed in this 0.4 weight percent formaldehyde run had less thermal stability than did the similarly prepared gel of Example XV which contained a 0.38 weight percent aldehyde mixture of acetaldehyde and formaldehyde.

Based on the results of the examples herein, and particularly Examples XV, XVI, and XVII, it is concluded that gelled acidic compositions of the invention prepared with mixtures of aldehydes, e.g., formaldehyde and acetaldehyde, are more stable to temperature than such compositions prepared with a single aldehyde. The reason for this surprising result is not completely understood at present.

EXAMPLE XVIII

A 64 ml sample of concentrated hydrochloric acid (37 weight percent HCl) was mixed with 33 ml of a 3 weight percent solution of a commercial cationic 90:10 copolymer of acrylamide and (methacryloyloxyethyl)-trimethylammonium methyl sulfate (Hercules Reten 210), 5 ml of 37 weight percent aqueous formaldehyde, and sufficient water to give a test solution containing 1 weight percent of said cationic copolymer, 28 weight percent HCl, and 2 weight percent formaldehyde. A 15 ml portion of this test solution was drawn into a capillary viscometer and the mixture gelled at 112° F. Gelation began in the temperature interval of 101°-106° F. as evidenced by an increase in efflux time from 9.2 to 16 seconds. On further heating to 175° F. the gel turned cloudy and at 200° F. syneresis was about 15%.

A duplicate sample was placed in a 200° F. bath and gelation occurred in one minute. This gel was maintained in the 200° F. bath for 30 minutes and syneresis was about 50%.

Based on this result, it is concluded that cationic polyacrylamides, at least those with 10% of the side-chains being cationic, can be used in the practice of the invention.

Additional runs using other cationic polyacrylamides are described in Examples XIX and XX.

EXAMPLE XIX

A 28 weight percent aqueous HCl solution containing 1 weight percent cationic acrylamide copolymer of about 8,000,000 molecular weight and containing cationic functionality provided by the comonomer (acryloyloxyethyl)diethylmethylammonium methyl sulfate became gelled in the presence of 0.16 weight percent formaldehyde at 118° F. in a capillary viscometer. Gelation began in the temperature interval of 107°-115° F. as evidenced by an increase in efflux time from 12.4 to 32 seconds. As the gel was heated syneresis began at about 170° F. and syneresis was about 50% complete at 200° F.

An unheated portion of the test solution gelled within one hour at ambient temperature.

EXAMPLE XX

A 28 weight percent aqueous HCl solution containing 1 weight percent of a commercial cationic 80:20 copolymer of acrylamide and (acryloyloxyethyl)diethylmethylammonium methyl sulfate, having a molecular weight of about 15,000,000, and 0.16 weight percent formaldehyde gelled in a capillary viscometer at 115° F. Gelation began in the temperature interval of 103°-112° F. as evidenced by an increase in efflux time from 10.8 to 15.2 seconds. On further heating of this gel to 200° F., syneresis became about 50%.

Another sample of the above cationic copolymer test solution was gelled in about 2 minutes at ambient temperature in the presence of 0.24 weight percent acetaldehyde. On further heating of this gel, a viscosity decrease was noted at about 190° F. and syneresis started at about 200° F.

EXAMPLE XXI

A 64 ml sample of concentrated hydrochloric acid (37 weight percent HCl) was mixed with 33 ml of a 3 weight percent solution of a commercial cationic 80:20 copolymer of acrylamide and (methacryloyloxyethyl)-trimethylammonium methyl sulfate (Hercules Reten 220), 0.4 ml of 37 weight percent aqueous formaldehyde, and sufficient water to give a test solution containing 1 weight percent of said cationic copolymer, 28 weight percent HCl, and 0.16 weight percent formaldehyde. A 15 ml portion of the test solution was placed in a capillary viscometer and the mixture gelled at 131° F. Gelation began in the temperature interval of 122°-125° F. as evidenced by an increase in efflux time from 6.4 to 9.2 seconds. On further heating to 200° F. in a total elapsed time of 60 minutes in the hot water bath, syneresis was 10 percent.

EXAMPLE XXII

A 64 ml sample of concentrated hydrochloric acid (37 weight percent HCl) was mixed with 33 ml of a 3 weight percent solution of a commercial cationic 55:45 copolymer of acrylamide and (methacryloyloxyethyl)-trimethylammonium methyl sulfate (Hercules Reten 245), 0.4 ml of 37 weight percent aqueous formaldehyde, and 2 ml water to give a test solution containing 1 weight percent of said cationic copolymer, 28 weight percent HCl, and 0.16 weight percent formaldehyde. A 15 ml portion of this test solution was placed in a capillary viscometer and the mixture gelled at 132° F. Gelation began in the temperature interval of 124°–128° F. as evidenced by an increase in efflux time from 8.1 to 14.6 seconds. On further heating to 200° F. in a total elapsed time of 77 minutes in the hot water bath, there was no syneresis. After an additional hour at 200° F., there was only a trace of syneresis and the gel was still elastic.

EXAMPLE XXIII

A 96 ml sample of concentrated hydrochloric acid (37 weight percent HCl) was mixed with 50 ml of a 3 weight percent solution of a commercial cationic 55:45 copolymer of acrylamide and (methacryloyloxyethyl)-trimethylammonium methyl sulfate (Hercules Reten 245), 2 ml water, 1.5 ml of 37 weight percent aqueous formaldehyde, and 0.5 ml acetaldehyde to give a test solution containing 1 weight percent of said cationic copolymer, 28 weight percent HCl, 0.4 weight percent formaldehyde, and 0.25 weight percent acetaldehyde. A 110 ml portion of this test solution was placed in a pressure bottle, heated to 180° F. and then placed in a 250° F. oil bath for a period of 2 hours. The solution gelled during said heating to 180° F. The solution remained gelled during 2 hours at 250° F. but the gel broke up in pieces to a small degree when shaken.

EXAMPLE XXIV

A 64 ml sample of concentrated hydrochloric acid (37 weight percent) was mixed with 33 ml of a 3 weight percent solution of a commercial cationic 40:60 copolymer of acrylamide and (methacryloyloxyethyl)trimethylammonium methyl sulfate (Hercules Reten 260), 0.4 ml of 37 weight percent aqueous formaldehyde, and 2 ml water to give a solution containing 1 weight percent of said cationic copolymer, 28 weight percent HCl, and 0.16 weight percent formaldehyde. A 15 ml portion of this test solution was drawn into a capillary viscometer and the mixture gelled at 131° F. Gelation began in the temperature interval of 121°–125° F. as evidenced by an increase in efflux time from 11.8 to 60 seconds. After 2 hours at 200° F., there was no syneresis.

EXAMPLE XXV

A 64 ml sample of concentrated hydrochloric acid (37 weight percent HCl) was mixed with 33 ml of a 3 weight percent solution of a commercial cationic 40:60 copolymer of acrylamide and (methacryloyloxyethyl)-trimethylammonium methyl sulfate (Hercules Reten 260) 0.3 ml acetaldehyde, and 2 ml water to give a solution containing 1 weight percent of said cationic copolymer, 28 weight percent HCl and 0.235 weight percent acetaldehyde. A 15 ml portion of this test solution was drawn into a capillary viscometer and the mixture was a gel at 150° F. Gelation began in the temperature interval of 90° to 92° F. as evidenced by an increase in efflux time from 56 to 197 seconds. On further heating to 168° F., the gel began to thin as the efflux time decreased to 95 seconds. The sample remained a lightly gelled fluid after 2 hours at 200° F.

EXAMPLE XXVI

A 96 ml sample of concentrated hydrochloric acid (37 weight percent HCl) was mixed with 50 ml of a 3 weight percent solution of a commercial cationic 40:60 copolymer of acrylamide and (methacryloyloxyethyl)-trimethylammonium methyl sulfate (Hercules Reten 260), 1.5 ml of 37 weight percent aqueous formaldehyde, 0.5 ml acetaldehyde, and 2 ml water to give a test solution containing 1 weight percent of said cationic copolymer, 28 weight percent HCl, 0.4 weight percent formaldehyde, and 0.25 weight percent acetaldehyde. A 110 ml portion of this solution was placed in a pressure bottle, heated to 180° F., sealed and placed in a 250° F. oil bath. During a period of 2 hours at 250° F., the gel broke into several lumps on shaking but most of the gel healed by the end of the 2-hour period.

A 15 ml sample of the above test solution was placed in a capillary viscometer and the mixture gelled at 110° F. Gelation began in the temperature interval of 87°–99° F. as evidenced by an increase in efflux time from 36.5 to 310 seconds.

EXAMPLE XXVII

A 64 ml sample of concentrated hydrochloric acid (37 weight percent HCl) was mixed with 6.7 g of a 15 weight percent solids sample of a commercial cationic homopolymer of (methacryloyloxyethyl)trimethylammonium methyl sulfate (Hercules Hercofloc 828 containing Reten 300), 5 ml of 37 weight percent aqueous formaldehyde, and 24 ml of water to give a test solution containing 1 weight percent of said cationic homopolymer, 28 weight percent HCl, and 2 weight percent formaldehyde. A 15 ml portion of this test solution was drawn into a capillary viscometer and the mixture did not gel in a hot water bath heated to a temperature of 199° F. in a period of 54 minutes. The maximum efflux time during the heating period was 1.7 seconds.

EXAMPLE XXVIII

A 64 ml sample of concentrated hydrochloric acid (37 weight percent HCl) was mixed with 33 ml of a 3 weight percent solution of a commercial partially hydrolyzed polyacrylamide (Betz Poly Floc 1120, degree of hydrolysis: 25 percent), 0.4 ml of 37 weight percent aqueous formaldehyde, and sufficient water to give a test solution containing 1 weight percent partially hydrolyzed polyacrylamide, 28 weight percent HCl, and 0.4 weight percent formaldehyde. A 15 ml portion of this solution was drawn into a capillary viscometer and the mixture gelled at 113° F. Gelation began in the temperature interval of 103°–109° F. as evidenced by an increase in efflux time from 6.9 to 34 seconds. On further heating to 190° F. syneresis was about 75 percent and increased to about 85 percent at 200° F.

EXAMPLE XXIX

A 64 ml sample of concentrated hydrochloric acid (37 weight percent) was mixed with 33 ml of a 3 weight percent solution of a commercial partially hydrolyzed polyacrylamide (Betz Poly Floc 1110, degree of hydrolysis 18.5 percent), 0.4 ml of 37 weight percent formaldehyde, and sufficient water to give a test solution containing 1 weight percent partially hydrolyzed polyacrylamide, 28 weight percent HCl, and 0.16 weight percent formaldehyde. A 15 ml portion of this solution was drawn into a capillary viscometer and the mixture gelled at 106° F. Gelation began in the temperature interval 92°-101° F. as evidenced by an increase in efflux time from 8.7 to 22.9 seconds. On further heating to 190° F. syneresis was about 60 percent and increased to about 65 percent at 200° F.

EXAMPLE XXX

A 159 ml sample of concentrated hydrochloric acid (37 weight percent HCl) was mixed with 83 ml of a 3 weight percent solution of a commercial partially hydrolyzed polyacrylamide (Betz Poly Floc 1130, degree of hydrolysis: 36.8 percent) and stirred with a spatula. A white gelatinous mass of polymer resulted. This mixture was stirred with a Hamilton Beach malt mixer and the white mass of polymer tended to climb the impeller and had to be held down until dispersed. The mixture was stirred for 20-30 seconds at high speed before becoming homogeneous and then stirred at a moderate rate for an additional minute. A 1 ml sample of 37 weight percent aqueous formaldehyde and 7 ml of water were stirred into the homogeneous acid-polymer mixture to give a composition containing 1 weight percent partially hydrolyzed polyacrylamide, 28 weight percent HCl, and 0.4 weight percent formaldehyde. A 15 ml portion of this mixture was placed in a capillary viscometer and the mixture gelled at 130° F. Gelation began in the temperature interval 121°-124° F. as evidenced by an increase in efflux time from 5.3 to 18.3 seconds. On further heating to 154° F. the gel was clear and elastic but at 171° F. syneresis began and at 173° F. syneresis was progressing rapidly.

EXAMPLE XXXI

A sample was prepared by mixing 64 ml water, 33 g of a 3 weight percent solution of a partially hydrolyzed polyacrylamide (Hercules Reten 420), 0.75 ml concentrated nitric acid (70 weight percent $HNO_3$, 1.4 g/ml), 0.6 ml (0.47 g) acetaldehyde, and sufficient water to give 100 ml of solution. A 15 ml portion of this test solution gelled in a capillary viscometer at 175° F. Gelation began in the temperature range of 165°-172° F. as evidenced by an increase in the efflux time from 10.1 to 19.3 seconds.

The above run demonstrates that nitric acid can be gelled in the process of the present invention.

Based on the above data, it is concluded that gelled acidic compositions comprising an aqueous solution of a suitable polymer of acrylamide having incorporated therein a suitable acid, and a suitable aldehyde, in suitable amounts in accordance with the above-stated compatibility requirements, are suitable for use in acidizing operations in accordance with the invention. From the viscosity data and the stability data of the examples it is further concluded that the components of the gelled compositions have sufficient compatibility with each other to permit good penetration (as defined above) into the formation, and permit maintaining of the compositions in contact with the formation for a period of time usually sufficient for the acid to significantly react with the acid-soluble components of the formation. Thus, it is further concluded that suitable compositions in accordance with the invention could be used advantageously for acidizing operations in wells having a depth of up to at least 10,000 feet, and at formation temperatures of up to at least 200° F. The use of a preflush cooling fluid injected down the well and into the formation prior to the injection of the gelled acidic composition would extend said ranges of operation. As will be understood by those skilled in the art, the actual attainable ranges of effective acidizing operation will depend upon the viscosity of the gelled composition, the formation temperature, the composition of the formation, the rate of injection of the gelled acidic composition, the acid concentration in said gelled acidic composition, etc.

In those embodiments of the invention wherein a mixture of aldehydes is used it is presently preferred that formaldehyde (or paraformaldehyde) be one of the aldehydes in said mixture because of lower cost and ready availability. It is presently preferred that in such mixtures the amount of formaldehyde (or paraformaldehyde) be within the range of from about 20 to about 75, more preferably about 25 to about 50, weight percent of the mixture of aldehydes.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A gelled acidic composition, suitable for matrix-acidizing or fracture-acidizing of a porous subterranean formation susceptible of attack by an acid, comprising:

water;

from 0.2 to 3 weight percent, based on the total weight of said composition, of a water-dispersible random copolymer represented by the formula

I

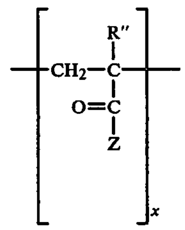

II

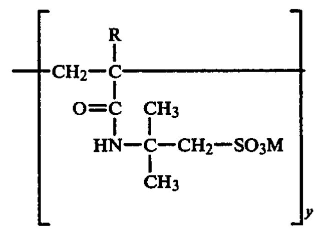

wherein: R and R'' are each a hydrogen atom, or a methyl radical; M is hydrogen, sodium, or potassium; Z is either $-NH_2$ or $-OM$ in the above Type I monomer units, with the proviso that the copolymer contains at least 10 mol percent of said Type I monomer units in which Z is $-NH_2$; and x and y are the mol percent values of the respective monomer units I and II, with x being in the range of from 20 to 95 and with y being in the range of from 5 to 80;

from 0.4 to 60 weight percent, based on the total weight of said composition, of a non-oxidizing acid which is capable of reacting with a significant amount of the acid-soluble components of said formation; and from 0.001 to 5 weight percent, based on the total weight of said composition, of a water-dispersible aldehyde selected from the group consisting of aliphatic monoaldehydes having from 1 to 10 carbon atoms, glyoxal, glutaraldehyde and terephthaldehyde;

said polymer, said acid, and said aldehyde, in the amounts used, being sufficiently compatible with each other in an aqueous dispersion thereof to permit gelation and thus form a said composition having sufficient stability to degeneration by the heat of said formation to permit good penetration of said composition into said formation when injected thereinto and the maintenance of said composition in said formation in contact therewith for a period of time usually sufficient for the acid in said composition to react significantly with the acid-soluble components of said formation and stimulate the production of fluids therefrom.

2. A composition according to claim 1 wherein:

the amount of said copolymer is within the range of from 0.75 to about 2 weight percent;

said acid is hydrochloric acid, and the amount thereof is sufficient to provide an amount of HCl within the range of from 0.4 to about 35 weight percent; and said aldehyde is selected from the group consisting of the $C_1$ to $C_{10}$ aliphatic monoaldehydes, and mixtures thereof, and the amount of said aldehyde is within the range of from 0.004 to about 2 weight percent.

3. A composition according to claim 2 wherein said aldehyde is formaldehyde.

4. A composition according to claim 2 wherein said aldehyde is a mixture of formaldehyde and acetaldehyde.

5. A composition according to claim 2 wherein:

R and R″ are each hydrogen;

M in said Type II monomer unit is sodium;

said copolymer contains at least 90 mol percent of said Type I monomer units in which Z is $—NH_2$;

the value of x is within the range of from 30 to 90; and the value of y is within the range of from 10 to 70.

6. A composition according to claim 5 wherein said aldehyde comprises a mixture of formaldehyde and acetaldehyde.

7. A composition according to claim 2 wherein:

R and R″ are each hydrogen;

M in said Type II monomer unit is sodium;

said copolymer contains at least 90 mol percent of said Type I monomer units in which Z is $—NH_2$;

the value of x is about 30, and the value of y is about 70; and said aldehyde is formaldehyde or paraformaldehyde.

8. A composition according to claim 2 wherein:

R and R″ are each hydrogen;

M in said Type II monomer unit is sodium;

said copolymer contains at least 90 mol percent of said Type I monomer units in which Z is $—NH_2$;

the value of x and y are each about 50; and said aldehyde is formaldehyde.

9. A composition according to claim 2 wherein:

R and R″ are each hydrogen;

M in said Type II monomer unit is sodium;

said copolymer contains at least 90 mol percent of said Type II monomer units in which Z is $—NH_2$;

the value of x is about 30, and the value of y is about 70; and said aldehyde is a mixture of formaldehyde and acetaldehyde.

* * * * *